(12) United States Patent
Rallo (10) Patent No.: US 9,098,285 B2
(45) Date of Patent: *Aug. 4, 2015

(54) NON-INTRUSIVE POWER MANAGEMENT

(71) Applicant: TSO LOGIC INC., Vancouver (CA)

(72) Inventor: Aaron J. Rallo, Vancouver (CA)

(73) Assignee: TSO Logic Inc., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,712

(22) Filed: Aug. 22, 2014

(65) Prior Publication Data

US 2014/0365804 A1   Dec. 11, 2014

Related U.S. Application Data

(63) Continuation of application No. 13/039,214, filed on Mar. 2, 2011, now Pat. No. 8,850,243.

(51) Int. Cl.
| | |
|---|---|
| *G06F 1/00* | (2006.01) |
| *G06F 1/32* | (2006.01) |
| *G06F 11/34* | (2006.01) |
| *G06F 9/50* | (2006.01) |

(52) U.S. Cl.
CPC ............ *G06F 1/3287* (2013.01); *G06F 1/3206* (2013.01); *G06F 1/3209* (2013.01); *G06F 1/3203* (2013.01); *G06F 1/329* (2013.01); *G06F 9/505* (2013.01); *G06F 9/5083* (2013.01); *G06F 9/5088* (2013.01); *G06F 11/3433* (2013.01); *Y02B 60/1282* (2013.01)

(58) Field of Classification Search
CPC ....... G06F 1/3203; G06F 1/329; G06F 9/505; G06F 9/5083; G06F 9/5088; G06F 11/3433
USPC ........... 713/300, 320, 323; 718/100, 102, 105
See application file for complete search history.

(56) References Cited

U.S. PATENT DOCUMENTS

| | | | |
|---|---|---|---|
| 7,177,901 | B1 | 2/2007 | Dutta |
| 8,850,243 | B2 * | 9/2014 | Rallo .............................. 713/320 |
| 2004/0024853 | A1 | 2/2004 | Cates et al. |
| 2005/0273456 | A1 | 12/2005 | Revanuru et al. |
| 2006/0184287 | A1 | 8/2006 | Belady et al. |
| 2006/0276216 | A1 | 12/2006 | Tongen |
| 2007/0143454 | A1 | 6/2007 | Ma et al. |
| 2008/0082604 | A1 | 4/2008 | Mansour et al. |
| 2010/0169477 | A1 | 7/2010 | Stienhans et al. |
| 2011/0022868 | A1 | 1/2011 | Harchol-Balter et al. |

OTHER PUBLICATIONS

International Search Report for PCT/US2012/027221 dated May 30, 2012.

* cited by examiner

*Primary Examiner* — Michael J Brown
(74) *Attorney, Agent, or Firm* — Sheppard, Mullin, Richter & Hampton LLP (57) ABSTRACT

A method and system for managing power consumption of a pool of computing devices are disclosed. One aspect of certain embodiments includes managing resource utilization for each computing device without installing customized software, firmware or hardware on the computing device and dynamically selecting, one or more candidate computing devices for altering their respective power states based on at least real-time information on the quantity of requests.

19 Claims, 5 Drawing Sheets

Class Diagram
FIG. 4

FIG. 5

LoadInformation Class Hierarchy

Utilization Predictor Class Hierarchy

FIG. 6

Resource Query Mechanism Class Hierarchy

FIG. 7

Load Balancer Class Hierarchy

FIG. 8

NON-INTRUSIVE POWER MANAGEMENT

CROSS REFERENCE TO RELATED APPLICATIONS

This application claims priority to U.S. patent application Ser. No. 13/039,214 filed Mar. 2, 2011, entitled, "Non-intrusive Power Management," by Aaron Rallo, and which is hereby incorporated by reference in its entirety.

TECHNICAL FIELD

The disclosed embodiments relate generally to power management in any pool of computing devices that are logically grouped to provide a common set of functionality. More particularly, the disclosed embodiments relate to power management in server pools, interchangeably referred to as server clusters, typically found in large computing establishments like data centers.

BACKGROUND

The proliferation of the Internet, devices that access it, and consequently, Internet based services are driving an insatiable thirst for computational power. To meet this need, large data centers have been set up. Typical data centers house hundreds, maybe even thousands of servers, and serve as the backbone for a variety of Internet services. The services hosted by data centers typically come with the requirement of high availability, close to 99.9% up time, which is usually supported by replicating servers and maintaining spare capacity. Furthermore, data centers are designed for a peak loads which are both occasional and short lived. As a result, data centers tend to consume large amounts of power. In phases that the data center is not fully loaded, idle servers can be shutdown without substantial loss in performance. When the load increases, powered off servers can be booted-up to service the requests and maintain Quality of Service (QoS).

Reducing the power consumption of a data center contributes to reduced operational expense, and allows the data center operator to invest in newer hardware and supporting infrastructure, to save money and/or to provide improved services to customers. Prior studies have reported that servers can draw close to 60% of their peak power consumption when idle, and that the global electricity costs for data centers have been reported as running into the billions. Therefore, substantial reduction in power consumption can be achieved by shutting down idle servers.

BRIEF DESCRIPTION OF THE DRAWINGS

For a better understanding of the aspects of the invention as well as embodiments thereof, reference should be made to the description of embodiments below, in conjunction with the following drawings in which like reference numerals refer to corresponding parts throughout the figures.

DESCRIPTION OF EMBODIMENTS

Methods, systems and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

The embodiments described herein are in reference to servers in data centers. However, the embodiments apply to any pool of computing devices that are logically grouped to provide a common set of functionality.

According to certain embodiments, the problem associated with power consumption in data centers can be effectively managed by turning off or turning on servers in response to the load experienced by the data center. Servers are turned on when the load increases and turned off when load decreases. Load can be defined by the number and/or size of requests that are being received by the server pool per unit time interval, for example.

According to certain embodiments, a new server or device is characterized to understand how the resource utilization changes as the number of requests being serviced changes by the server/device. The characterization, using statistical analysis techniques, can be used to predict the utilization of the server/device for a given load. The correlation function associated with the characterization is stored in a database, for example. A power management server can retrieve the correlation function during initialization. The power management server takes decisions at regular time intervals to shutdown a server/device, power-on a server/device or maintain status quo in the pool of servers/devices based on the predicted utilization.

According to certain embodiments, a non-intrusive mechanism is used to power down servers or devices. In contrast, existing power management solutions typically require that the data center operators install software, firmware or hardware on the servers/devices for power management. Such power management decisions are taken by a centralized administrative software component which communicates with the software installed in the individual servers, which then initiate the action. The custom software typically sends information that the centralized entity can use for decision making. Such an approach is intrusive unlike the non-intrusive approach as described in the embodiments herein. The embodiments described herein do not require any such additional software, firmware or hardware installation on each server/device in the data center.

According to certain embodiments, a centralized entity takes power management decisions and initiates them on the servers/devices without the need for custom software, hardware or firmware. The centralized entity uses information exported by the OS only of the servers/devices. Such an approach requires little or no downtime for installation, does not require custom software to be installed, or require any major system reconfiguration.

Further, unlike vendor specific solutions, the embodiments are not restricted to hardware vendors (processor or OEM) or to operating systems.

Figure 1:
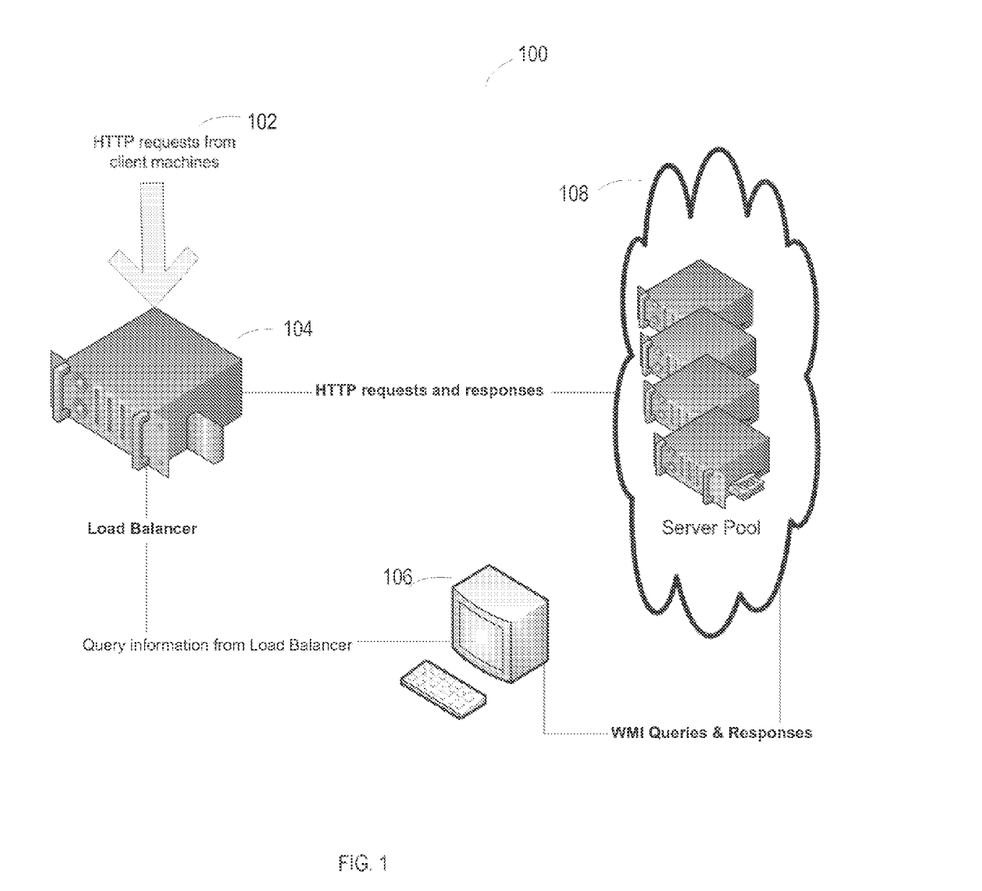
FIG. 1 is a high-level block diagram illustrating power management of a pool of computing devices that are logically grouped to provide a common set of functionality, according to certain embodiments of the invention.

FIG. 1 is a high-level block diagram illustrating power management of a pool of computing devices that are logically grouped to provide a common set of functionality, such as servers in a data center, according to certain embodiments of the invention. In FIG. 1, system 100 includes an application delivery controller 104 that receives HTTP requests 102 from client devices, and a computer 106 that executes the power manager. Application delivery controller 104 sends the HTTP requests 102 to the server pool 108 and also receives the responses to the HTTP requests from server pool 108. The power manager implemented in computer 106 receives information from application delivery controller 104 and information from the server pool 108 to make power management decisions. The power manager may be implemented on multiple computers as in a distributed computer system, according to certain embodiments. Application delivery controller 104 may be a commercial off-the-shelf load balancer, according to certain embodiments. Similarly, computer 106 can be an off-the-shelf computer on which the power management solution is installed and executes. Server pool 108 or server cluster comprises server machines or nodes that service requests from client devices via application delivery controller 104. An application delivery controller is hardware or software that manages requests received from client devices and distributes such requests to the computing devices in the server pool. A non-limiting example of an application delivery controller is a load balancer.

HTTP requests initiated by client devices reach application delivery controller 104 which redirects the requests to an appropriate server in the server pool 108. According to certain embodiments, application delivery controller 104 is configured to use a round robin policy. Consequently, server nodes in server pool 108 service a comparable number of requests. The power manager interacts with application delivery controller 104 to obtain information including but not limited to:
   Information on the number of requests being executed by each server in server pool 108,
   the average response time by each server in server pool 108, and
   information on server state.

The power manager does not service any requests from client devices. The power manager's job is to make power management decisions and initiate such decisions, while maintaining consistency between actual server state and information at application delivery controller 104.

Figure 6:
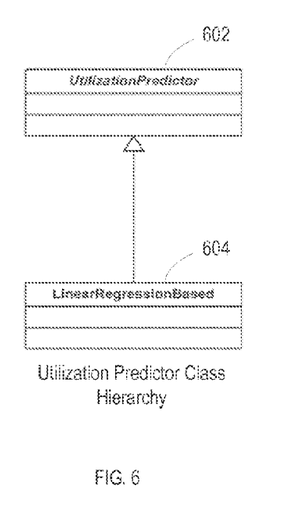
FIG. 6 illustrates the class diagram for the UtilizatonPredictor class hierarchy, according to certain embodiments of the invention.
Figure 7:
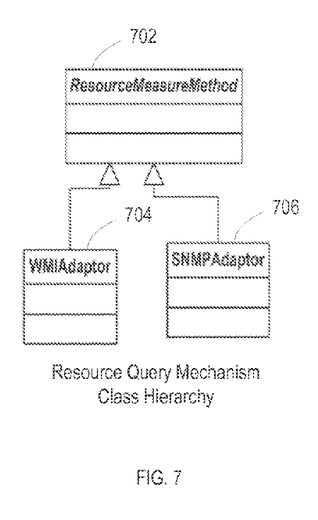
FIG. 7 illustrates the class diagram for the ResourcesMeasureMethod class hierarchy, according to certain embodiments of the invention.

According to one aspect of certain embodiments, each server of at least a subset of servers in the server pool is characterized for the utilization behaviour of that particular server. Characterization involves measuring on the server to be characterized, the utilization of various resources as the number of requests being executed by the server varies. Such measurement information is utilized to draw correlations between the number of requests being serviced by the server that is being characterized and its utilization of resources, according to certain embodiments. The power manager (computer 106) can remotely query the servers in server pool 108 to obtain resource utilization information using standardized protocols like Simple Network Management Protocol (SNMP) for any OS or Windows Management Instrumentation (WMI) for MS Windows. The correlation drawn can be used to predict the utilization of a given server for any given number of HTTP requests being serviced per minute, according to certain embodiments. According to certain embodiments, the characterization is performed using the same application that the server to be characterized is expected to execute in production because a server can be expected to show differences in behaviour with different application types.

According to certain embodiments, correlation information is obtained using well established statistical analysis techniques such as linear regression. The statistical analysis can be performed using any commercially/freely available statistical analysis software such as R statistical software. According to certain embodiments, the correlation information is an expression that correlates the number of requests to the CPU utilization. According to some embodiments, this correlation information is XML serialized and inserted into a database along with other information that the power management solution requires. XML serialization is the process of converting a binary object in memory into an XML representation that can then be stored on disk (files or database). For purposes of simplicity, the statistical analysis is done in the background and the results are stored in the database. The process of deriving correlations can be made real time, according to certain embodiments.

Figure 2:
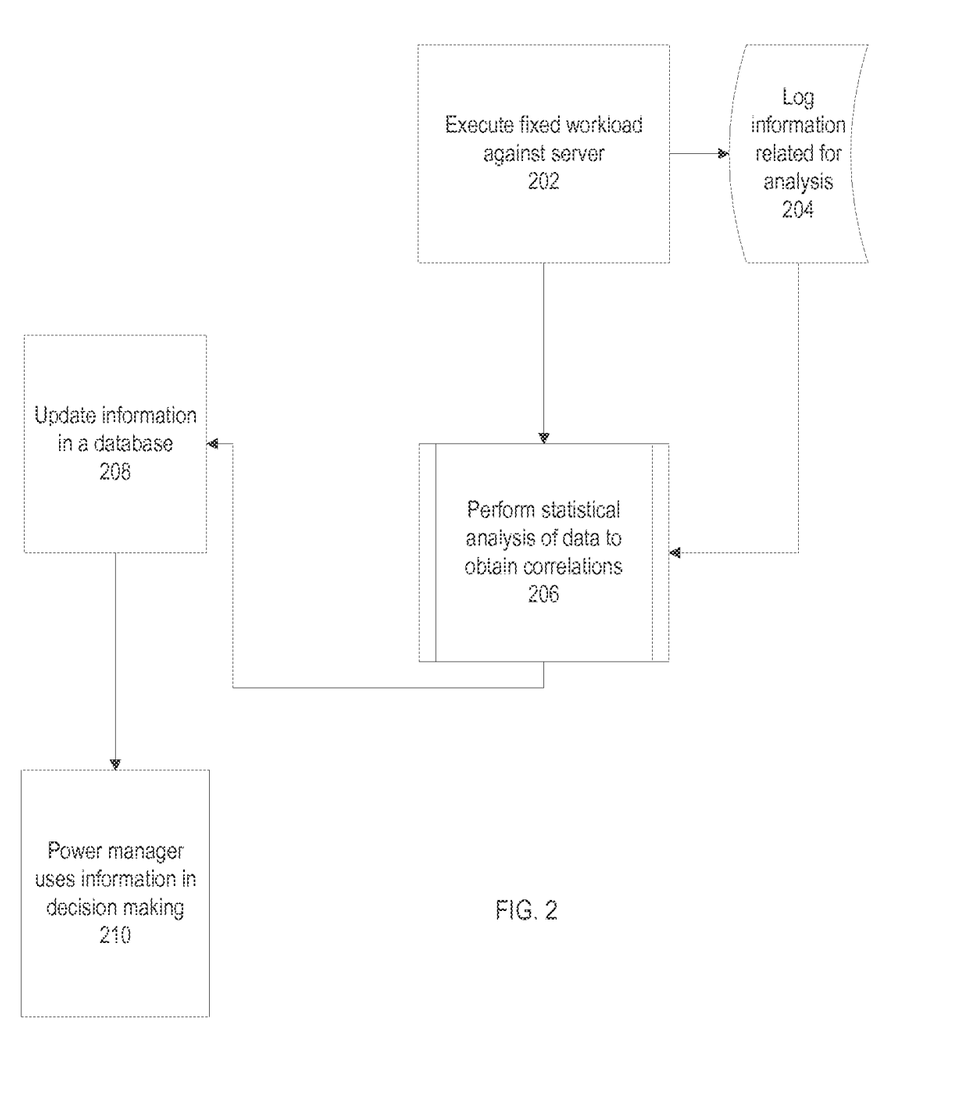
FIG. 2 is a block diagram showing some of the high-level steps for obtaining correlation information associated with the servers in the server pool, according to certain embodiments of the invention.

FIG. 2 is a block diagram showing some of the high-level steps for obtaining correlation information associated with the servers in the server pool, according to certain embodiments of the invention. At block 202, a fixed workload is executed against a given server that is to be characterized. At block 204, the information on resource utilization, workload and other related information is logged for analysis. At block 206, statistical analysis is performed on the information to obtain correlation information. At block 208, the correlation information for the given server is stored in the database. If the database already contains correlation information for the particular server, then the correlation information is updated. At block 210, the power manager retrieves correlation information for making power management decisions.

The power manager runs at regular intervals. For example, the power manager can run every 10 seconds. At each iteration of the power manager solution, a decision is taken as to whether a server needs to be powered on or powered off. The power manager also identifies which server must be powered on or off based on a server selection policy. The server selection policy is described herein.

Figure 3:
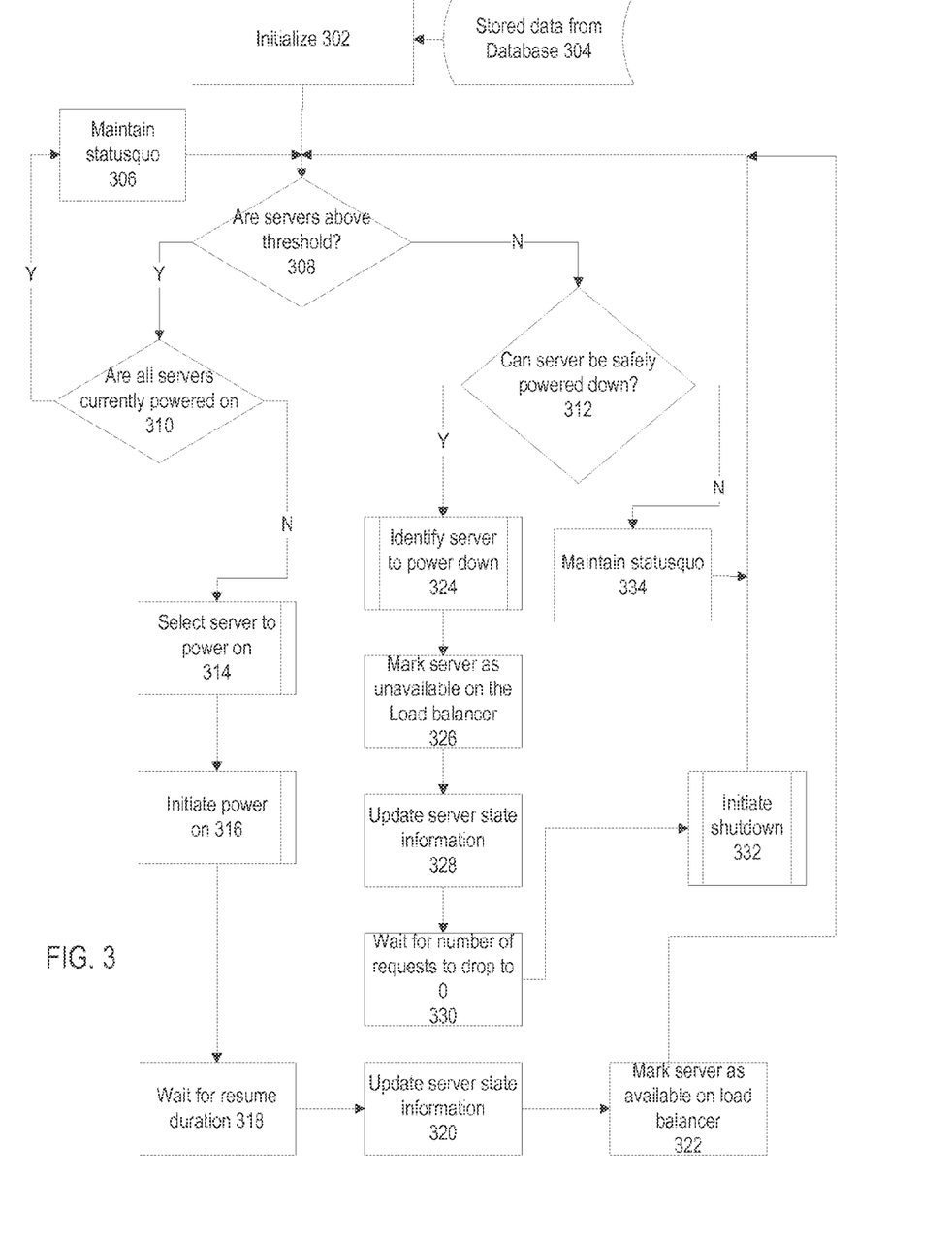
FIG. 3 is a block diagram that illustrates a power management method, according to certain embodiments of the invention.

FIG. 3 is a block diagram that illustrates the power management method, according to certain embodiments of the invention. After initialization at block 302, correlation data is retrieved from the database at block 304. At block 308, on each iteration, the power manager checks if all the servers in the server pool are above a pre-configured utilization threshold called the overload threshold, according to certain embodiments. According to certain other embodiments, the utilization threshold is determined dynamically rather than being pre-configured. If all the servers are above the utilization threshold, then at block 310, the power manager determines if all the servers in the server pool are powered on. If all the servers are powered on, then at block 306, the status quo of the server pool is maintained. If not all servers in the server pool are powered on, then at block 314, the power manager identifies which server is to be powered on, if more than one server is not powered on in the server pool. At block 316, the power manager initiates power-on process for the selected server. At block 318, the power manager waits for the resume duration. At block 320, the power manager updates the state information for the selected server that was just powered on. At block 322, the server that was just powered on is marked on the application delivery controller as available for servicing requests.

If at block 308, it is determined that not all the servers in the server pool are above the utilization threshold, then at block 312 a check is made to identify if any server in the server pool can be powered off safely. If none of the servers in the server pool can be powered off safely, then the status quo is maintained at block 334.

If there are servers in the server pool can be powered off, then at block 324, the power manager identifies a server to be powered off. The server identified to be powered off is referred to as a candidate server. A decision to power off is taken only if the load on the candidate server can be migrated to the remaining power-on servers in the server pool without causing such remaining power-on servers to cross an overload threshold associated with a given server. At block 326, the server identified to be powered off is marked as unavailable on the application delivery controller. At block 328, the state information of the server to be powered off is updated. At block 330, the power manager waits for the number of requests sent to the server to be powered off drops to zero. At block 332, the power manager initiates the power-off process for the server to be powered off.

Powering servers on or off can be done using existing mechanisms supported by operating systems of the servers. For example, Windows Management Instrumentation (WMI) on Microsoft Windows or ssh based remote command execution on Linux/Solaris can be used for powering servers on or off.

According to certain embodiments, a staggered suspend and boot up process is used at a given point in time. In other words, exactly one server is suspending or resuming at a given time. The staggered suspend ensures that there is capacity in the server pool to handle any spikes in the load and thus is a conservative approach. Staggered resume ensures that the load on the power supply for the server does not go high because computers typically draw higher power during the boot up phase.

According to certain embodiments, the power management method can include the following features:

Predicting the demand: Historical data can be analysed to predict the demand that the server pool will experience in the next time interval. The prediction can augment the decisions taken by the power manager. Existing statistical methods like Auto Regressive Moving Average can be used for the time based trend analysis and prediction.

Predict the number of servers or devices required to support a given workload.

Chart the response time and performance of a server or a device under a given workload.

Moving server nodes across pools: The power management method described herein can be extended to multiple pools using a global power management scheme. In such a global power management scheme, it is possible to move servers across pools to serve the needs of various pools. Depending on the demand, servers can be either moved across pools or turned on/off.

The Advanced Configuration and Power Interface (ACPI) specification defines the following server states, according to certain embodiments. Other suitable standards for defining server states can also be used. The embodiments are not restricted to the ACPI standard.

TABLE 1

ACPI Server States

| Server state | Global State | Description |
|---|---|---|
| S0 | G0 | Server is powered on and operational. |
| S1 and S2 | G1 | Undefined and unused. |
| S3 | G1 | Suspended to RAM - Operating system context stored in RAM and most components powered down. Typically RAM and NIC are active in this state. |
| S4 | G1 | Suspend to Disk - Operating system context is written to disk and server is powered down. |
| S5 | G2 | Soft off - Server is powered down, no OS context is retained. |
| S5 | G3 | Mechanical off - Server is powered down and main power supply is cut off. |

According to certain embodiments, servers are switched between S0 and S5.

If all the servers in the server pool have similar properties like operating frequency, RAM, disk space etc, the choice of server to shutdown/resume become trivial because any server can be chosen. However, if the server pools are heterogeneous pools, where servers differ in their properties, then a server selection policy is needed in order to select an appropriate server to power on or off. According to certain embodiments, policies that can be used to select servers if multiple servers are available for shutdown/resume are described below:

Polices for server power off include but are not limited to:
1. Lowest Frequency: Power off the server that operates at the lowest frequency.
2. Highest power: Power off the server that consumes the highest power.
3. Max post-utilization: Power off the server that will result in other servers having high utilization.
4. Types of applications running on the system (application capabilities).

The policies for server power on include but are not limited to:
1. Lowest power: Power on the server that consumes lowest power.
2. Highest frequency: Power on the server that runs at the highest frequency.
3. Shortest Resume Time: Power on the server that takes the shortest time to boot up.

As a non-limiting example, suspend policy 3 (max post-utilization) and resume policy 2 (highest frequency) can be used, according to certain embodiments. It is possible to support any combination of policies, but the power management mechanism must ideally be configured to use the ones that provide high power savings without significant loss in performance. Further, different combinations of suspend and resume policies will show different power/performance characteristics.

At any point in time, at least one server will be active in the pool. The reasoning behind having at least one server active is to have available computational capacity to handle requests while other servers are resuming.

As a non-limiting example, turning servers off is achieved by issuing a remote shutdown command using WMI (as our cluster is currently MS Windows based). Remote command execution requires that appropriate services are enabled on the server and appropriate ports are kept on in the firewall. Alternate techniques can be used for Linux and Solaris. Servers are turned on using Wake-On-LAN (WoL), an industry standard technique to resume computers that are currently suspended. A WoL packet is a specially crafted network packet which contains a WoL header and the MAC address of the target server repeated 16 times WoL packet definition is standardized. WoL must be supported by the network interface card (NIC) and also enabled by the operating system driver. Modern NICs typically support WoL.

Such a non-intrusiveness approach does not require any additional software components to be installed on the individual servers in the server pool for the power manager to work. At most, it requires certain standard operating system services which might be turned off by default (like ssh, snmp) to be turned on.

Figure 4:
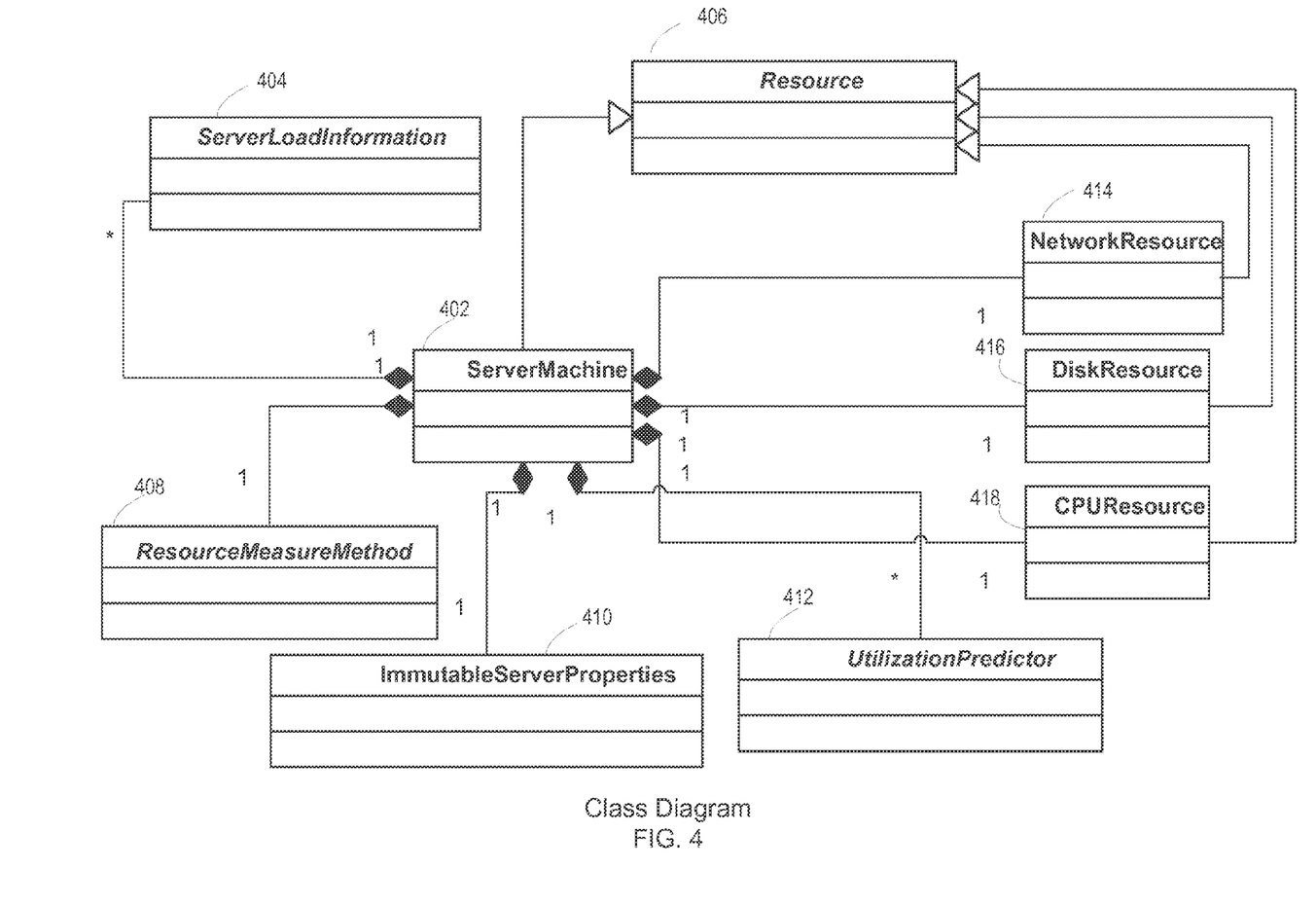
FIG. 4 illustrates the class diagram of the central classes used for implementing the power manager, according to certain embodiments of the invention.

FIG. 4 illustrates the class diagram of the central classes used for implementing the power manager, according to certain embodiments. FIG. 4 shows ServerMachine class 402, ServerLoadInformation class 404, Resource class 406, ResourceMeasureMethod class 408, ImmutableServerProperties class 410, UtilizationPredictor class 412, NetworkResource class 414, DiskResource class 416, and CPUResource class 418. The central data structure to the application is a ServerMachine class 402 that holds information about a server in the server cluster. The ServerMachine class contains the immutable server properties (like MAC address, maximum operating frequency, power consumption etc) and dynamically created objects for measuring resource utilization (see FIG. 7), predicting the utilization (FIG. 6), storing load information (FIG. 5) etc. A server contains resource objects—CPU, Disk, network, and memory, and is a resource in itself. The utilization predictor for each server is read from on disk storage (a database, for example) as an XML serialized stream and then de-serialized to get the object.

Some of the hierarchies of other classes used in the implementation of the power manager are described herein with reference to FIGS. 5-8.

Figure 5:
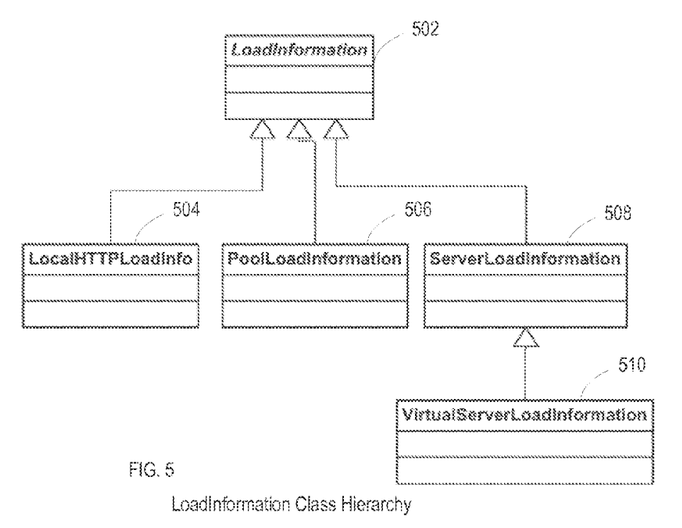
FIG. 5 illustrates the class diagram for the LoadInformation class hierarchy, according to certain embodiments of the invention.

FIG. 5 illustrates the class diagram for the LoadInformation class hierarchy, according to certain embodiments. LoadInformation class defines classes that are used to store information on connections/requests queried at regular intervals from the load balancer or server. FIG. 5 shows that LoadInformation class 502 includes LocalHTTPLoadInfo class 504, PoolLoadInformation class 506, and ServerLoadInformation class 508. ServerLoadInformation class 508 includes VirtualServerLoadInformation class.

FIG. 6 illustrates the class diagram for the UtilizationPredictor class hierarchy, according to certain embodiments. UtilizationPredictor class 602 includes LinearRegressionBased class 604.

FIG. 7 illustrates the class diagram for the ResourcesMeasureMethod class hierarchy, according to certain embodiments. ResourcesMeasureMethod class 702 includes WMIAdaptor class 704 and SNMPAdaptor class 706.

Figure 8:
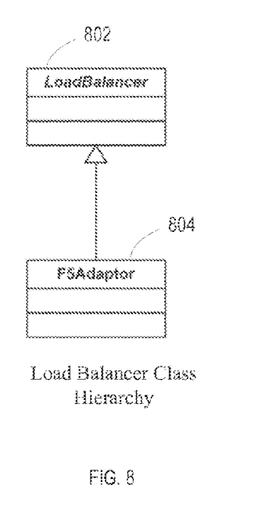
FIG. 8 illustrates the class diagram for the LoadBalancer class hierarchy, according to certain embodiments of the invention.

FIG. 8 illustrates the class diagram for the LoadBalancer class hierarchy, according to certain embodiments. LoadBalancer class 802 includes F5Adaptor class 804. The load balancer class hierarchy is used to define classes that can be used to query and control the load balancer. s According to certain embodiments, a simple database with a single table is used to store information about individual servers.

The characterization phase requires utilization information to be gathered from servers for later analysis. According to certain embodiments, this information is stored in a database. The utilization information of each resource is stored in a separate file with the format shown in Table 2 Utilization Information, as non-limiting example.

TABLE 2

| Utilization information | | |
| --- | --- | --- |
| Date-Time stamp | Resource utilization (varying from 0-100%) | Weighted Moving average utilization (0-100%) |

The weighted moving average is used to help smoothing any sharp fluctuations in the measured utilization. An example for CPU utilization on a dual core machine, measured using WMI is given below.

| Date-Time stamp | Core 0 | Core 1 | Total | Moving Avg (Core 0) | Moving Avg (Core) | Moving Avg (Total) |
| --- | --- | --- | --- | --- | --- | --- |

The level of detail—per core utilization—is not provided by SNMP implementations. However, overall system utilization is available and the power manager implementation uses the overall utilization for analysis and decision making.

I claim:

1. A method of power management, the method comprising:
   using a computerized power manager for managing resource utilization associated with each computing device from at least a subset of computing devices of a plurality of computing devices without installing customized software, firmware or hardware on the computing device for managing the resource utilization;
   receiving, by the computerized power manager, real-time information from an application delivery controller, the real-time information including information on a quantity of requests and information on size of a request, wherein the application delivery controller receives the requests and redirects the requests to one or more computing devices of the plurality of computing devices; and
   in response to receiving the real-time information on the quantity of requests, dynamically selecting, by the computerized power manager, a candidate computing device from the subset of computing devices for controlling the power state of the candidate device based on at least the real-time information on the quantity of requests.

2. The method of claim 1, further comprising:
   measuring resource utilization on a respective computing device for a given number of requests executed by the respective computing device; and
   obtaining correlation information between the measured resource utilization and the number of requests executed by the respective computing device; and
   using a set of power utilization criteria.

3. The method of claim 2, wherein the set of power utilization criteria comprises:
   lowest operating frequency;
   highest power consumption;

maximum post-utilization;
lowest power consumption;
highest operating frequency;
shortest resume time; and
application capabilities.

4. The method of claim 1, further comprises:
determining an overload threshold for the subset of computing devices;
determining if all power-on computing devices in the subset of computing devices are above the overload threshold;
selecting a first computing device from the subset of computing devices to power on or put into an increased power state if all power-on devices in the subset of computing devices are above the overload threshold; and
selecting a second computing device from the subset of computing devices to power off or put into a reduced power state if all power-on computing devices in the subset of computing devices are below the overload threshold.

5. The method of claim 4, wherein determining an overload threshold can be determined dynamically or can be pre-defined.

6. The method of claim 4, wherein selecting a second computing device to power off further comprises:
identifying a computing device, if any, to power off based on a set of power utilization criteria;
marking the identified computing device as unavailable;
updating state information for the identified computing device; and
initiating shut down for the identified computing device.

7. The method of claim 4, wherein selecting a second computing device to put into a reduced power state further comprises:
identifying a computing device, if any, to put into a reduced power state based on a set of power utilization criteria; and
updating state information for the identified computing device.

8. The method of claim 3, wherein selecting a first computing device to power on further comprises:
identifying a computing device, if any, to power on based on a set of power utilization criteria;
updating state information for the identified computing device; and
initiating power-on for the identified computing device.

9. The method of claim 4, wherein selecting a first computing device to put into an increased power state further comprises:
identifying a computing device, if any, to put into an increased power state based on a set of power utilization criteria; and
updating state information for the identified computing device.

10. The method of claim 1, wherein the subset of computing devices are logically grouped to provide a common set of functionality.

11. The method of claim 10, further comprising moving computing devices from the subset of computing devices to one or more other subsets of computing devices to optimize the power management across the subsets of computing devices.

12. The method of claim 1, further comprising:
predicting usage demand associated with the subset of computing devices; and
using the predicted usage demand to augment selection of a candidate computing device from the subset of computing devices for powering on, powering off, increasing power state, or decreasing power state.

13. The method of claim 1, wherein the subset of computing devices comprises one or more of: servers, storage devices, network switches, network routers, wireless access points, and cooling equipment.

14. A system for power management of at least a subset of computing devices of a plurality of computing devices, the system comprising:
at least one application delivery controller for receiving requests; and
at least one power management machine for managing resource utilization associated with each computing device from the subset of computing devices and for receiving real-time information from the application delivery controller, the real-time information including information on a quantity of requests and information on size of a request, wherein the application delivery controller redirects the requests to one or more computing devices of the plurality of computing devices, and wherein the at least one power management machine uses the real-time information and a set of power utilization criteria for selecting a candidate computing device from the subset of computing devices for controlling the power state of the candidate computing device, wherein the subset of computing devices do not include customized software, firmware or hardware for managing the resource utilization.

15. The system of claim 14, wherein the least one power management machine interacts with the application delivery controller to obtain information on the total number of requests received by the application delivery controller and the number of requests executed by each computing device in the subset of computing devices.

16. The system of claim 14, wherein the least one power management machine remotely queries each computing device for information on the number of requests and resource utilization information in the subset of computing devices.

17. The system of claim 14, wherein the at least one power management machine is used for:
determining an overload threshold for the subset of computing devices; and
determining if all power-on computing devices in the subset of computing devices are above the overload threshold;
selecting a first computing device from the subset of computing devices to power on or put into an increased power state if all power-on computing devices in the subset of computing devices are above the overload threshold; and
selecting a second computing device from the subset of computing devices to power off or put into a reduced power state if all power-on devices in the subset of computing devices are below the overload threshold.

18. The system of claim 14, wherein the power utilization criteria comprises:
lowest operating frequency;
highest power consumption;
maximum post-utilization;
lowest power consumption;
highest operating frequency;
shortest resume time; and
application capabilities.

19. The method of claim 14, wherein the subset of computing devices comprises one or more of: servers, storage devices, network switches, network routers, wireless access points, and cooling equipment.

* * * * *